United States Patent [19]

Walleser

[11] Patent Number: 4,765,945

[45] Date of Patent: Aug. 23, 1988

[54] METHOD AND APPARATUS FOR MEASURING THE FILLING LEVEL IN A REACTOR PRESSURE VESSEL OF A BOILING-WATER REACTOR

[75] Inventor: Albin Walleser, Offenbach, Fed. Rep. of Germany

[73] Assignee: Kraftwerk Union Aktiengesellschaft, Mülheim/Ruhr, Fed. Rep. of Germany

[21] Appl. No.: 934,699

[22] Filed: Nov. 25, 1986

[30] Foreign Application Priority Data

Nov. 25, 1985 [DE] Fed. Rep. of Germany ....... 3541613

[51] Int. Cl.$^4$ ............................................. G21C 17/00
[52] U.S. Cl. ...................................... 376/258; 73/299
[58] Field of Search ................... 73/292, 299; 376/258

[56] References Cited

U.S. PATENT DOCUMENTS

| | | | |
|---|---|---|---|
| 2,791,906 | 5/1957 | Vetter | 73/299 |
| 3,371,534 | 3/1968 | Akeley | 73/299 |
| 4,389,888 | 6/1983 | Morooka | 73/299 |
| 4,394,346 | 7/1983 | Morooka | 73/299 |
| 4,414,177 | 11/1983 | Tokarz | 376/258 |

FOREIGN PATENT DOCUMENTS

| | | | |
|---|---|---|---|
| 2941544 | 4/1980 | Fed. Rep. of Germany . | |
| 0111093 | 8/1979 | Japan | 376/245 |
| 0086314 | 7/1981 | Japan | 73/299 |
| 0133613 | 10/1981 | Japan | 73/299 |
| 0137114 | 10/1981 | Japan | 73/299 |
| 0050619 | 3/1982 | Japan | 73/299 |
| 0104593 | 6/1984 | Japan | 376/258 |
| 0203994 | 11/1984 | Japan | 376/258 |
| 0100091 | 6/1985 | Japan | 376/258 |
| 1384390 | 2/1975 | United Kingdom | 73/299 |

OTHER PUBLICATIONS

BWK-Brebbstoff Warme-Kraft, vol. 28, No. 6, pp. 229-233, Jun. 1976.
Patents Abstract of Japan, vol. 6, No. 34 (P-104)[912] Mar. 2, 1982 and JP-A-56 154 617.
Patents Abstracts of Japan, vol. 8, No. 269 (P-319)[1706] Dec. 8, 1984; and JP-A-59 137 823.
Regelungstechnische Praxis (Control Engineering Practice), vol. 17, No. 5, Issue 5, pp. M17-M20, R. Oldenburg Verlag, München, Germany; G. Strohrmann.
"Solution of MSR-Problems" p. M18, left column, Paragraph under FIG. 86—p. M18, right Column, Further Methods of Measuring Hydrostatic Filling Level.

Primary Examiner—Deborah L. Kyle
Assistant Examiner—Richard W. Wendtland
Attorney, Agent, or Firm—Herbert L. Lerner; Laurence A. Greenberg

[57] ABSTRACT

A method for measuring the filling level of a liquid in a pressure vessel of a boiling-water reactor, includes measuring the pressure difference between a lower subspace and a reference column, determining steam density in an upper subspace from the measured pressure, determining liquid density in the lower subspace, determining the liquid density in the column, subsequently determining the level in the vessel from the liquid densities in the lower subspace and column, from the steam density in the upper subspace and from the pressure difference and from taking into account time-dependent transient alterations of the values of the densities by measuring the pressure change over time in the upper subspace, the power output and the temperature of the liquid in the vessel, determining therefrom the liquid density in the lower subspace and the steam density in the upper subspace with the measured pressure in the steam space and with known dimensions and quantities, and measuring ambient temperature in the vicinity of the column and determining the liquid density in the column therefrom with known quantities, by using a vertical distance between the bottom of the vessel and a connecting flange of an input line of a pressure difference meter connected to the lower subspace, using a vertical distance between the two connecting flanges, the second flange belonging to a pressure input line of the top of the column and being connected to the upper subspace, and using the gravity constant of the earth.

4 Claims, 1 Drawing Sheet

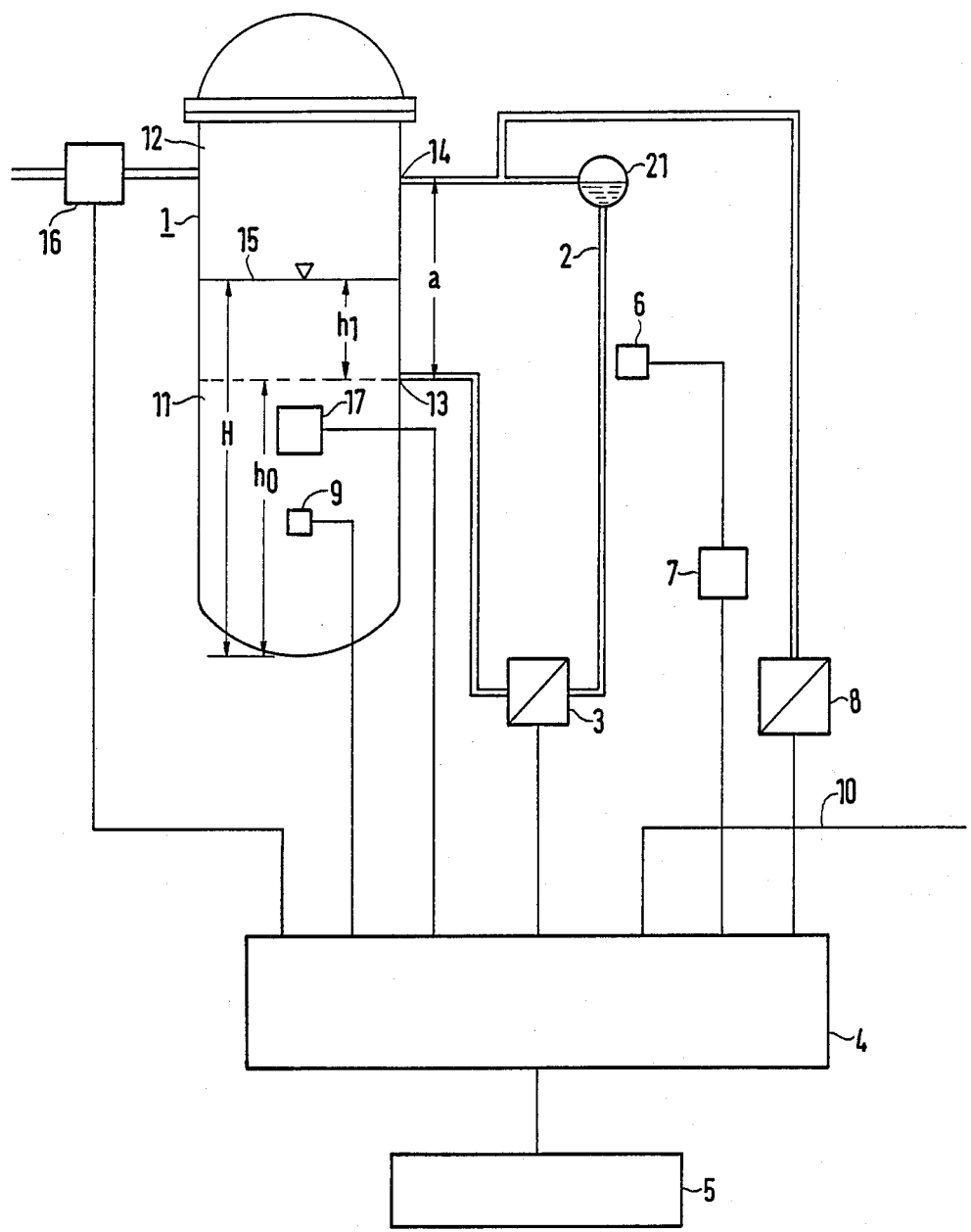

METHOD AND APPARATUS FOR MEASURING THE FILLING LEVEL IN A REACTOR PRESSURE VESSEL OF A BOILING-WATER REACTOR

The invention relates to a method for measuring the filling level of a liquid in a reactor pressure vessel of a boiling-water reactor, wherein the pressure is measured in an upper steam-filled subspace of the reactor pressure vessel and where the pressure difference is measured between a lower fluid-filled subspace of the reactor pressure vessel and a reference column which is connected to the steam-filled upper subspace of the reactor pressure vessel, and where the filling level in the reactor pressure vessel is then determined from the liquid densities in the lower subspace of the reactor pressure vessel and in the reference column, from the steam density in the upper subspace which can be determined from the measured pressure, and from the measured pressure difference.

Methods known to date assume that the pressure of the liquid in the reactor pressure vessel only varies slightly due to pressure fluctuations in the steam space. Except for a pressure correction, a farther-reaching correction of the known liquid density has not been made. Therefore, ths measured filling level does not correspond to the actual filling level in the reactor pressure vessel. The deviations are large, especially in the event of a disturbance, since it is just at that time that the density of the liquid is influenced by several parameters.

In addition, a uniformly constant temperature of the reference column is assumed, but is not assured. Consequently, the liquid density in the reference column is also not constant. In addition, dynamic effects on the measured pressure difference which are caused by the steam mass flow and by the core flow rate or throughput, for instance, remain unaccounted for.

The values obtained with the prior art methods for measuring the filling level in a reactor pressure vessel are only reliable within tolerable error limits under ideal ambient conditions. In the event of temperature variations outside the reactor pressure vessel and especially if the pressure in the reactor pressure vessel drops and a mixture is formed at the boundary surface of the liquid and the steam due to a disturbance, the filling level measurement according to heretofore-known methods is unreliable. It is just ir the event of a disturbance, however, that exact monitoring of the filling level in the reactor pressure vessel is desirable.

It is accordingly an object of the invention to provide a method for measuring the filling level in a reactor pressure vessel of a boiling-water reactor which overcomes the hereinafore-mentioned disadvantages of the heretofore-known devices of this general type and which takes into consideration measurement quantities which cause a faulty measurement result in the event of a disturbance, in addition to the known parameters. It should thereby be possible to determine the filling level in the reactor pressure vessel in case of an accident, with uniformly high accuracy.

With the foregoing and other objects in view there is provided, in accordance with the invention, a method for measuring the filling level of a liquid in a reactor pressure vessel of a boiling-water reactor, having an upper steam-filled subspace in the reactor pressure vessel, a lower liquid-filled subspace in the reactor pressure vessel, and a reference column connected to the steam-filled upper subspace, which comprises: measuring the pressure difference ($\Delta_p$) between the lower subspace and the reference column, determining the steam density ($\rho_2$) in the upper from the measured pressure, determining the liquid density ($\rho_1$) in the lower subspace, and determining the liquid density ($\rho_0$) in the reference column, and subsequently determining the filling level (H) in the reactor pressure vessel according to the equation $$H = h_o + \frac{g \cdot a(\rho_0 - \rho_2) - \Delta_p}{g(\rho_1 - \rho_2)}$$

from the liquid densities ($\rho_1$), ($\rho_2$) in the lower subspace and in the reference column and from the steam density ($\rho_2$) in the upper subspace, and from the measured pressure difference ($\Delta_p$) and from taking into account time-dependent transient alterations of the values of ($\rho_0$, $\rho_1$ and $\rho_2$) by measuring the pressure change over time in the upper steam-filled subspace, the reactor power output and the temperature of the liquid in the reactor pressure vessel, determining therefrom more accurately the liquid density ($\rho_1$) in the lower subspace and the steam density ($\rho_2$) in the upper subspace with the measured pressure in the steam space and with known dimensions and quantities, and measuring the ambient temperature in the vicinity of the reference column and determining the liquid density ($\rho_0$) in the reference column therefrom with known quantities, wherein $h_o$ is the constant vertical distance between the bottom of the reactor pressure vessel and a connecting flange, the flange belonging to one of the input lines of a pressure difference meter and being connected to the lower subspace, and a is the vertical distance between the two connecting flanges, the latter belonging to a pressure input line of the top of the reference column and being connected to the upper subspace, and g is the corresponding gravity constant of the earth.

During undisturbed operation of the reactor pressure vessel, the liquid density in the vessel is influenced by the steam content of the liquid and by feeding-in relatively cool water, besides being influenced by the steam pressure. These two effects compensate each other to a large extent, so that no further correction other than the pressure correction is required. If, however, a pressure drop develops in the reactor pressure vessel during an accident, a liquid/steam mixture is formed at the boundary surface. The location of the mixture front, for which the liquid density is of importance, depends on additional parameters, besides the steam pressure in the reactor pressure vessel. These parameters are the temperature in the liquid, the change in time of the steam pressure, as well as the duration of the pressure change and the instantaneous reactor power output. The mean liquid density is determined from these quantities, which are measured or determined. The density of the liquid in the reference column depends on its ambient temperature. The influence of the pressure, on the other hand, is negligible. The temperature at the reference column is not always constant, especially in case of a loss-of-coolant accident within the containment, so that a correct value for the liquid density in the reference column can only be obtained with continuous monitoring of the temperature.

The invention achieves the advantage of detecting and reliably compensating all influences on the liquid density in the reactor pressure vessel and on the density in the reference column, especially in case of an accident. In this way, the filling level in the reactor pressure vessel is always determined reliably.

Supplementing the method according to the invention, the steam mass flow in the system and the measured pressure difference between the reactor pressure vessel and the reference column are corrected by two correction members or terms, the first one depending functionally on the steam mass flow and the second one on the core flow rate or throughput.

A pressure loss in the steam space of the reactor pressure vessel appears, which depends on the flow velocity of the main steam in the system and has an effect on the measurement of the pressure difference.

A correction can readily be carried out by means of a continuous measurement of the steam mass flow. The flow of the liquid in the reactor pressure vessel causes an underpressure at the measuring nozzle for the pressure difference which interferes with the measurement of the pressure difference. A correction can be carried out in a simple manner by continuously monitoring the core flow rate or throughput.

With these two additional corrections of the measured pressure difference between the reactor pressure vessel and the reference column, a value for the filling level in the reactor pressure vessel is obtained which itself is independent of dynamic influences. The measuring accuracy is therefore even further improved.

In order to carry out the method, there is provided an apparatus for measuring the filling level of a liquid in a reactor pressure vessel of a boiling-water reactor, the reactor pressure vessel having a liquid system, an upper steam-filled subspace and a lower subspace, comprising a reference column having a top, a vessel disposed at the top of the reference column and connected to the steam-filled upper subspace, a pressure difference measuring device or gauge connected between the liquid-filled lower subspace and the reference column, a pressure measuring device or gauge directly connected to the steam-filled upper subspace, an evaluation unit for determining a filling level in the reactor pressure vessel, electric lines connecting the pressure difference measuring device and the pressure measuring device to the evaluation unit, a temperature sensor disposed outside the reference column and connected to the evaluation unit, a further temperature sensor disposed in the liquid system of the reactor pressure vessel and connected to the evaluation unit, a data line for reactor output power connected to the evaluation unit, the evaluation unit containing a time delay member and at least one comparator for determining a change over time of the pressure measured by the pressure measuring device, the evaluation unit having an output supplying a value for the filling level in the reactor pressure vessel, and a control member or indicating instrument connected to the output of said evaluation unit.

With this device, the method according to the invention can be carried out reliably with simple means. Even in the event of an accident, a reliable value for the filling level in the reactor pressure vessel is obtained.

The temperature sensor disposed outside the reference column is connected to the evaluation unit through a delay stage. In this way, the time difference between a temperature change outside the reference column and the density change in the reference column triggered thereby is bridged, and correct density values and are always determined in the evaluation unit.

Supplementing the device according to the invention, a steam flow rate or throughput measuring device is disposed in the steam discharge lines of the reactor pressure vessel. In addition, a core flow rate or throughput measuring device is connected ahead of the reactor core. The two measuring devices are connected to the evaluation unit by electric lines. The additional measuring devices yield the advantage making it possible to monitor dynamic influences on the liquid and steam pressure measurement in the reactor pressure vessel. The values for the filling level in the reactor pressure vessel are therefore further improved.

The use of the invention for the first time provides the advantage of always permitting the filling level in the reactor pressure vessel of a boiling-water reactor to be determined reliably and with good accuracy, even during an accident.

Other features which are considered as characteristic for the invention are set forth in the appended claims.

Although the invention is illustrated and described herein as embodied in a method and apparatus for measuring the filling level in a reactor pressure vessel of a boiling-water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The single FIGURE of the drawing is a diagrammatic and schematic circuit diagram of an apparatus according to the invention for measuring the filling level in a reactor pressure vessel of a boiling-water reactor.

Referring now to the FIGURE of the drawing in detail, there is seen a reactor pressure vessel 1 having a lower subspace 11 which is filled with liquid and an upper subspace 12 which is filled with steam. In order to determine the filling level, a pressure difference measuring device 3 is connected between a connecting flange 13 at the lower subspace 11 and a reference column 2 which is filled with liquid. Disposed at the top of the reference column 2 is a vessel 21 which is partially filled with liquid defining a steam space. The steam space is connected through a line at a flange 14 to the upper subspace 12 of the reactor pressure vessel 1.

In the drawing, the vertical distance between the two connecting flanges 13 and 14 at the reactor pressure vessel 1 is designated with reference symbol a. The vertical distance between the lower flange 13 and a liquid level 15 in the reactor pressure level is designated with reference symbol h1. The value measured with the pressure difference measuring device is then:

$$\Delta p = g [\rho_0 \cdot a - \rho_1 \cdot h_1 - \rho_2(a - h_1)]$$

where $\rho_0$ stands for the liquid density in the reference column 2, $\rho_1$ stands for the liquid density in the lower subspace 11 and $\rho_2$ stands for the steam density in the upper subspace 12 of the reactor pressure vessel 1. Reference symbol g stands for the gravitation of the earth.

The filling level height of the liquid level 15 in the reactor pressure vessel is the sum of the distance h1 and a constant vertical distance h0 between the bottom of the reactor pressure vessel 1 and the connecting flange 13. The height H of the filling level is therefore determined from the functional relationship:

$$H = h_o + \frac{g \cdot a \cdot (\rho_0 - \rho_2) - \Delta p}{g \cdot (\rho_1 - \rho_2)}$$

Besides the pressure difference measuring device 3, the apparatus according to the invention for measuring the filling level has other measuring devices for such measurement variables which influence the required densities $\rho_0$, $\rho_1$ and $\rho_2$. The pressure difference measuring device as well as the additional measuring devices are connected to an evaluation unit 4, in which the height H of the filling level in the reactor pressure vessel 1 can be determined from the measured values together with the known pressures under normal conditions, the known geometric dimensions and the known gravity constant of the earth g. The output of the evaluation unit 4 is connected to a control unit 5 or an indicating instrument.

The apparatus according to the invention contains additional measuring devices as follows:

Since the liquid density in the reference column 2 depends on the ambient temperature, a temperature sensor 6 is disposed outside the reference column 2. The temperature sensor 6 is connected to the evaluation unit 4 through a delay stage 7, so that the time difference between a temperature change at the reference column 2 and a density change in the reference column 2 is bridged. Since the dependence of the liquid density $\rho_0$ on the pressure is negligible, the respective instantaneous density $\rho_0$ in the reference column 2 can be determined in the evaluation unit 4 from the measured temperature value.

In order to determine $\rho_2$ in the upper steam-filled subspace 12 of the reactor pressure vessel 1, the pressure is measured in the subspace 12 with a pressure sensor or pressure measuring device 8 which is connected to the upper connecting flange 14. The pressure values are fed to the evaluation unit 4. The density $\rho_1$ in the lower liquid-filled subspace 11 also depends on the pressure in the upper subspace 12 and is corrected by the measured values of the pressure sensor 8 in the evaluation unit 4. In addition, the liquid density $\rho_1$ in the lower subspace 11 depends on other parameters in the event of accidents which are accompanied by a drop of the pressure in the reactor pressure vessel 1. Due to the pressure drop, a mixture is formed in the reactor pressure vessel 1, so that the rise of the mixture front not only depends on the pressure but also also on the reactor power output, on the liquid temperature (undercooling), as well as on the pressure change over time and the duration of the pressure change. These variables can be determined by measurement. To this end, a further temperature sensor 9 which is connected to the evaluation unit 4, is disposed in the lower subspace 11 of the reactor pressure vessel 1. A data line 10 through which measurement data of the reactor power output are supplied from the outside, is also connected to the evaluation unit 4.

The evaluation unit 4 contains a time delay member and at least one comparator, so that the pressure change over time and the duration of the pressure change can be determined in the evaluation unit from the pressure values of the pressure sensor 8.

The output of the evaluation unit 4 delivers a value for the filling level in the reactor pressure vessel 1 to the control unit 5, which is free of external influences.

The value determined by the pressure difference measuring device 3 is further influenced by the flow velocity of the liquid at the connecting flange 13. A core flow rate or throughput measuring device 17 is disposed upstream of the reactor core, so that this influence can also be eliminated. Due to the geometry of the system, the main steam flow in the reactor pressure vessel 1 through the steam drier causes a pressure drop in the upper subspace 12 of the reactor pressure vessel 1. The effects of the pressure drop on the pressure difference are compensated by the measurement values of a steam flow rate or throughput measuring device 16 in the steam discharge line.

The additional measuring devices at the reactor pressure vessel 1 also permit the steam and liquid densities $\rho_0$, $\rho_1$ and $\rho_2$, besides the pressure difference $\Delta_p$ and therefore the filling level height H in the reactor pressure vessel 1, to be determined with great reliability.

I claim:

1. Method for measuring the filling level of a liquid in a reactor pressure vessel (1) of a boiling-water reactor, having an upper steam-filled subspace (12) in the reactor pressure vessel (1), a lower liquid-filled subspace (11) in the reactor pressure vessel, and a reference column (2) connected to the steam-filled upper subspace (12), which comprises:

measuring the pressure difference ($\Delta_p$) between the lower subspace (11) and the reference column (2), measuring the ambient temperature in the vicinity of the reference column (2) and determining the liquid density ($\rho_0$) in the reference column (2) therefrom with known quantities, measuring the temperature within the liquid-filled subspace, determining the steam density ($\rho_2$) in the upper subspace from the measured pressure, determining the liquid density ($\rho_1$) in the lower subspace, and subsequently determining the filling level (H) in the reactor pressure vessel (1) according to the equation $$H = h_o + \frac{g \cdot a(\rho_0 - \rho_2) - \Delta_p}{g(\rho_1 - \rho_2)}$$

from the liquid densities ($\rho_1$), ($\rho_0$) in the lower subspace (11) and in the reference column (2) and from the steam density ($\rho_2$) in the upper subspace (12), and from the measured pressure difference ($\Delta_1$) and from taking into account time-dependent transient alterations of said values of ($\rho_0$, $\rho_1$ and $\rho_2$) by measuring the pressure and the pressure change over time in the upper steam-filled subspace (12), the reactor power output and the temperature of the liquid in the reactor pressure vessel (1) and by considering the time difference between the ambient temperature change and the density change in the reference column, determining therefrom more accurately the liquid density ($\rho_1$) in the lower subspace (11) and the steam density ($\rho_2$) in the upper subspace (12) with the measured pressure in the steam space (12) and with known dimensions and quantities, wherein h is the constant vertical distance between the bottom of the reactor pressure vessel and a connecting flange (13), said flange belonging to one of the input lines of a pressure difference meter (3) and being connected to the lower subspace (11), and a is the vertical distance between the two connecting flanges (13 and 14), the latter belonging to a pressure input line of the top of the reference column and being connected to the upper subspace (12), and g is the corresponding gravity constant of the earth.

2. Method according to claim 1, which comprises measuring the steam flow rate and the liquid flow rate of the reactor pressure vessel (1), correcting the measured pressure difference with two correction members, varying the first correction member with the steam flow rate and varying the second correction member with the liquid flow rate.

3. Apparatus for measuring the filling level of a liquid in a reactor pressure vessel (1) of a boiling-water reactor, the reactor pressure vessel having a liquid system, an upper steam-filled subspace (12) and a lower subspace (11), comprising a reference column (2) having a top, a vessel (21) disposed at said top of said reference column and connected to said steam-filled upper subspace (12), a pressure difference measuring device (3) connected between said liquid-filled lower subspace (11) and said reference column (2), a pressure measuring device (8) directly connected to said steam-filled upper subspace (12), an evaluation unit (4) for determining a filling level in the reactor pressure vessel (1), electric lines connecting said pressure difference measuring device (3) and said pressure measuring device (8) to said evaluation unit, a temperature sensor (6) disposed outside said reference column (2) and connected to said evaluation unit (4), a time delay member (7) connected between said evaluation unit (4) and said temperature sensor (6) for bridging the time difference between the temperature change and the density change in said reference column (2), a further temperature sensor (9) disposed in the liquid system of the reactor pressure vessel (1) and connected to said evaluation unit (4), A data line (10) for reactor output power connected to said evaluation unit (4), said evaluation unit (4) containing a time delay member and at least one comparator for determining a change over time of the pressure measured by said pressure measuring device (8), said evaluation unit (4) having an output supplying a value for the filling level in the reactor pressure vessel (1), and a control member (5) connected to said output of said evaluation unit.

4. Apparatus according to claim 3, wherein the reactor pressure vessel (1) has steam discharge lines, and including steam flow rate measuring devices (16) disposed in said steam discharge lines and connected to said evaluation unit (4) for the correction of a measured pressure difference, and a core flow rate measuring device (17) disposed in front of the reactor core and connected to said evaluation unit (4) for the correction of a measured pressure difference.

* * * * *